United States Patent [19]
Ono et al.

[11] Patent Number: 5,331,343
[45] Date of Patent: Jul. 19, 1994

[54] OPTICAL APPARATUS WITH IMPROVED LENS MOUNTING DEVICE

[75] Inventors: Satoru Ono; Jun Kohsaka, both of Toyokawa, Japan

[73] Assignee: Minolta Camera Kabushiki Kaisha, Osaka, Japan

[21] Appl. No.: 791,045

[22] Filed: Nov. 12, 1991

[30] Foreign Application Priority Data

Nov. 13, 1990 [JP] Japan .................................. 2-308204
Mar. 12, 1991 [JP] Japan .................................. 3-046351

[51] Int. Cl.$^5$ ............................................. B41J 2/435
[52] U.S. Cl. ...................................... 346/108; 359/207
[58] Field of Search ..................... 346/107, 108, 76 L, 346/160; 359/205, 206, 207

[56] References Cited

U.S. PATENT DOCUMENTS 4,804,981 2/1989 Prakash et al. ...................... 346/108
4,866,459 9/1989 Tokita et al. ........................ 346/108

FOREIGN PATENT DOCUMENTS 2140510 11/1990 Japan .

*Primary Examiner*—Mark J. Reinhart
*Attorney, Agent, or Firm*—Price, Gess & Ubell

[57] ABSTRACT

An optical apparatus includes a laser beam emitter for outputting a laser beam modulated in accordance with image information, and a lens unit resting on a lens mount. The lens unit includes, all formed integral with one another, an effective lens portion, a cylindrical portion surrounding a side surface of the effective lens portion, and projections extending from peripheral positions of the cylindrical portion. The lens mount includes a holder for holding the cylindrical portion of the lens unit to be rotatable and axially slidable on an optical axis of the laser beam, and a groove formed in the bottom of the holder for receiving the projection.

21 Claims, 5 Drawing Sheets

OPTICAL APPARATUS WITH IMPROVED LENS MOUNTING DEVICE

BACKGROUND OF THE INVENTION (1) Field of the Invention

The present invention relates to an optical apparatus, and more particularly to a laser beam scanning optical apparatus including a deflector for deflecting a laser beam within a plane to form an image on a photoreceptor.

(2) Description of the Related Art

Various laser beam scanning optical apparatus have been proposed for incorporation into laser beam printers and facsimile machines for image recording purposes. Efforts are being made in relation to such apparatus to devise a simple structure for fixing optical elements such as a cylindrical lens, a toroidal lens, reflecting mirrors and the like to precise positions. In particular, the cylindrical lens used to compensate for a tilt of a polygon mirror, conventionally, is fixed to a holder having a shaft screwed to a mount which in turn is screwed to a case. Inclination of the generatrix of the lens is adjusted by rotating the holder shaft relative to the mount, while the focal point thereof is adjusted by moving the mount along an optical axis relative to the case. Such adjusting operations have been quite troublesome.

SUMMARY OF THE INVENTION

Having regard to the inconvenience noted above, an object of the present invention is to provide an optical apparatus having a simple structure for attaching a cylindrical lens and so on to a case with high precision, and facilitating adjustment of the generatrix and focal point of the cylindrical lens and so on.

The above object is fulfilled, according to one aspect of the present invention, by an optical apparatus comprising a laser beam emitter for outputting a laser beam modulated in accordance with image information; a lens unit including, all formed integral with one another, an effective lens portion, a cylindrical portion surrounding a side surface of the effective lens portion, and a projection extending from a peripheral position of the cylindrical portion, the effective lens portion having a double-centered curved surface for refracting the laser beam with different powers in a vertical direction and a horizontal direction; and a supporting device including a holder for holding the cylindrical portion of the lens unit to be rotatable and axially slidable on an optical axis of the laser beam, and a groove for receiving the projection.

In another aspect of the invention, there is provided an optical apparatus comprising a laser beam emitter for outputting a laser beam modulated in accordance with image information; a lens unit including an effective lens portion, and a cylindrical portion formed integral with and surrounding a side surface of the effective lens portion, the cylindrical portion defining a groove in a peripheral surface thereof, the effective lens portion having a double-centered curved surface for refracting the laser beam with different powers in a vertical direction and a horizontal direction; and a supporting device including a holder for holding the cylindrical portion of the lens unit to be rotatable and axially slidable on an optical axis of the laser beam, and a projection for extending into the groove.

According to the present invention, inclination of the generatrix need not be adjusted when the projection formed on the cylindrical portion of the lens unit is engaged in the groove formed in the supporting device, or when the projection formed on the supporting device is engaged in the groove formed in the lens unit. Further, when adjustment is required to correct dimensional errors of a component occurring during manufacture, inclination of the generatrix or the focal point may be adjusted by placing the lens unit to be rotatable on the supporting device without engaging the projection with the groove.

The present invention has for another object to provide a laser beam scanning optical apparatus which allows a lens unit to be secured to a supporting device with ease.

This object is fulfilled by an optical apparatus comprising a laser beam emitter for outputting a laser beam modulated in accordance with image information; a lens unit including, all formed integral with one another, an effective lens portion, a cylindrical portion surrounding a side surface of the effective lens portion, and a projection extending from a peripheral position of the cylindrical portion; and a supporting device including a holder for holding the cylindrical portion of the lens unit to be rotatable and axially slidable on an optical axis of the laser beam, a groove for receiving the projection, and a presser for pressing the lens unit.

In the above construction, the lens unit is pressed in place by the presser. Thus, the lens unit is secured to the supporting device without requiring a screwing operation.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DETAILED DESCRIPTION OF THE PREFERRED EMBODIMENTS

A laser beam scanning optical apparatus according to the present invention will be described hereinafter with reference to the accompanying drawings.

Figure 1:
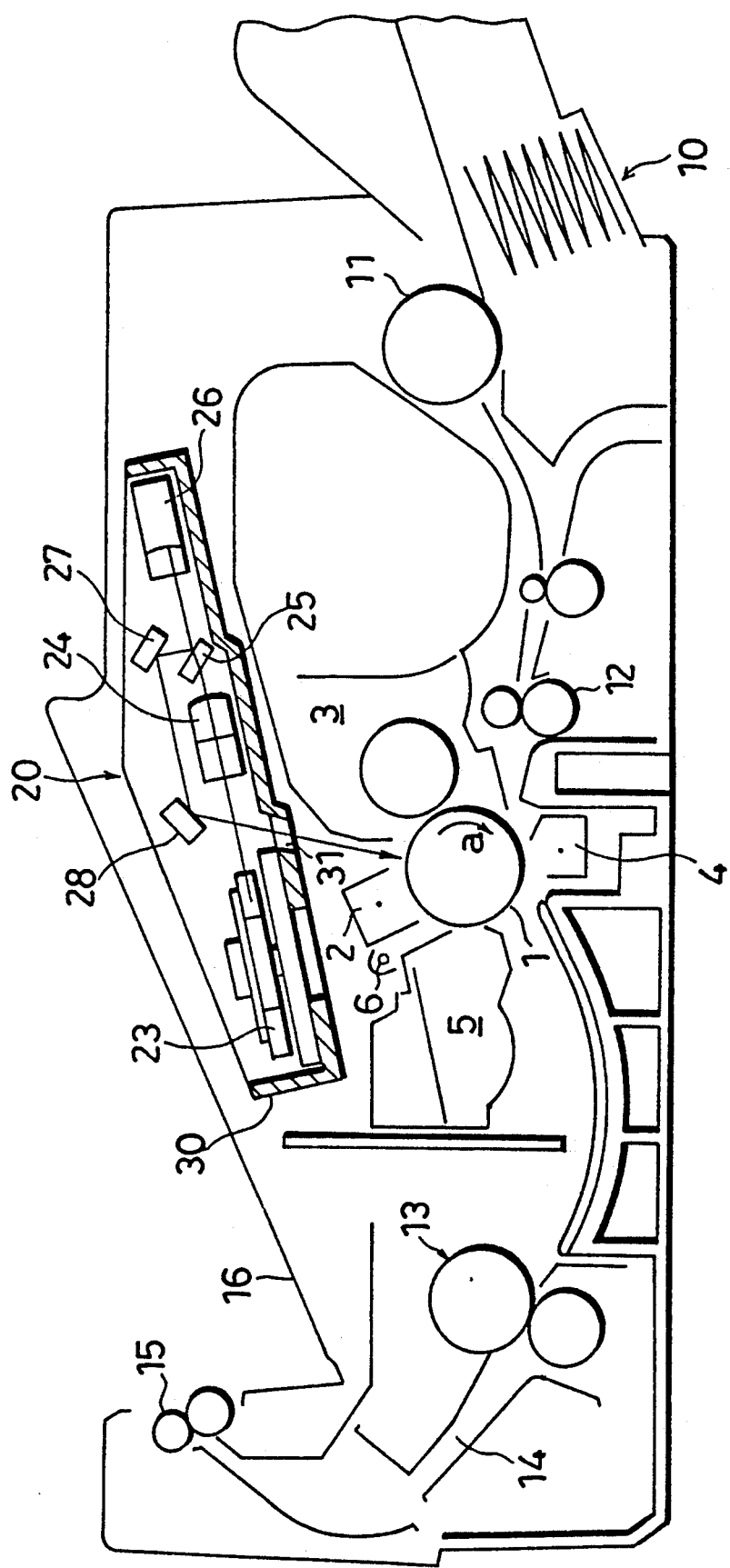
FIG. 1 is a schematic sectional view of a laser printer incorporating an optical unit which is a laser beam scanning optical apparatus according to the present invention.

FIG. 1 schematically shows a laser printer having an optical unit 20 embodying the present invention. The printer includes a photoreceptor drum 1 disposed approximately centrally thereof to be rotatable in a direction of arrow a. The drum 1 is surrounded by a corona charger 2, a magnetic brush type developer 3, a transfer charger 4, a blade type residual toner cleaner 5 and a residual charge eraser lamp 6. The constructions and functions of these image-forming elements are well known and not described herein.

Recording paper is stored in an autofeed cassette 10, and is fed sheet after sheet from the top with rotation of a feed roller 11. A sheet fed to the printer is stopped temporarily at a timing roller pair 12, and then transported with appropriate timing to a position between the photoreceptor drum 1 and transfer charger 4. An image is transferred to the sheet in this position, which image has been formed as a latent image on the drum 1 by the optical unit 20, which will be described in detail later, and visualized with toner by the developer 3. Subsequently, the toner is thermally fixed to the sheet by a fixing device 13, and the sheet is discharged through a passage 14 and a discharge roller pair 15 onto a discharge tray 16 on an upper surface of the printer.

The optical unit 20 includes an unillustrated light source assembly incorporating a semiconductor laser and a collimator lens, a cylindrical lens 40 (FIG. 2) which will be described in detail later, a polygon mirror 23, a toroidal lens 24, a half mirror 25, a spherical mirror 26, a first reflecting mirror 27 and a second reflecting mirror 28. These components are mounted in a plastic unit case 30.

The semiconductor laser is modulated (i.e. turned on and off) based on image information, and emits a laser beam when turned on. The laser beam is converged by the collimator lens for focusing at a predetermined forward point, and shaped by the cylindrical lens 40 into a substantially linear form. When reaching the polygon mirror 23, the linear beam has an elongate spot of a shape parallel to a main scanning direction, thereby preventing the influence of a tilt of the polygon mirror 23. The polygon mirror 23 is driven to rotate at a fixed velocity, to deflect the laser beam at a constant angular velocity in a plane perpendicular to a rotational axis of the polygon mirror 23. The deflected laser beam travels to the toroidal lens 24. The toroidal lens 24 has a fixed refracting power in a direction perpendicular to the plane of deflection. The toroidal lens 24, in combination with the cylindrical lens 40, causes the laser beam to form a spot on the photoreceptor drum 1. The laser beam then passes through the half mirror 25, reflected by the spherical mirror 26, and reflected upward by the half .mirror 25. Thereafter the beam is reflected by the first and second reflecting mirrors 27 and 28 to travel to the photoreceptor drum 1 through a slit 31 formed in a bottom surface of the unit case 30. The spherical mirror 26 has an f-theta function to correct a main scanning speed of the laser beam (correction of distortion), and a function to correct curvature of field on the photoreceptor drum 1.

Figure 2:
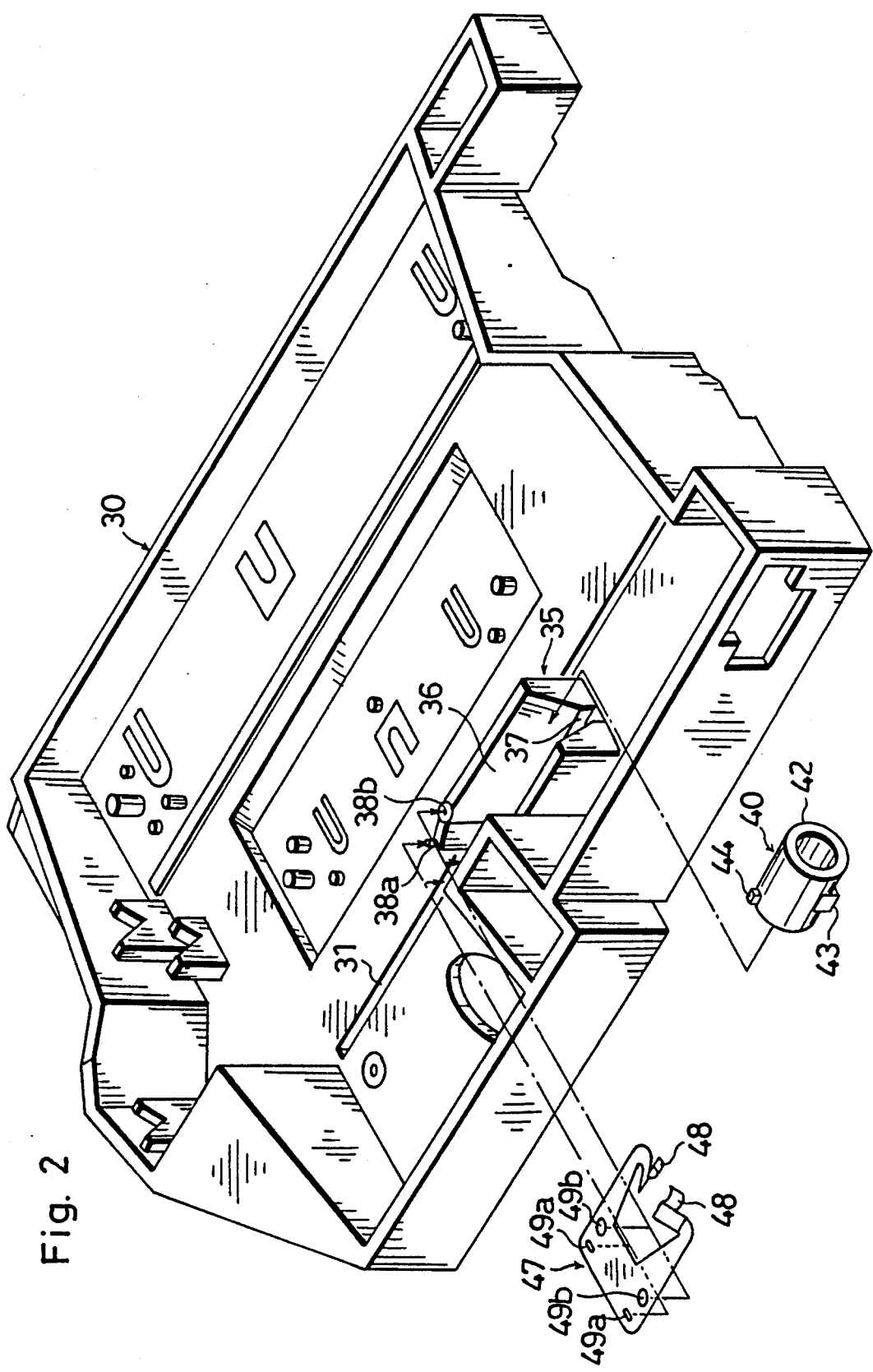
FIG. 2 is a perspective view of the optical unit.

FIG. 2 shows the unit case 30, in which the cylindrical lens 40 is placed on a mount 35 formed integrally with the unit case 30. A construction and a mounting structure in a first embodiment of the cylindrical lens 40 will be described with reference to FIGS. 3 through 6.

The cylindrical lens 40 is formed of plastic, and includes an effective lens portion 41, a cylinder 42 surrounding the effective lens portion 41, and a first projection 43 and a second projection 44 formed peripherally at one end of the cylinder 42 with 180° between the two projections 43 and 44. The mount 35 includes a V-shaped lens holder 36 and a groove 37 formed in the bottom of the holder 36. The cylinder 42 of the cylindrical lens 40 fits in the holder 36 so that the lens axis concurs with a principal ray of the laser beam.

Figure 3:
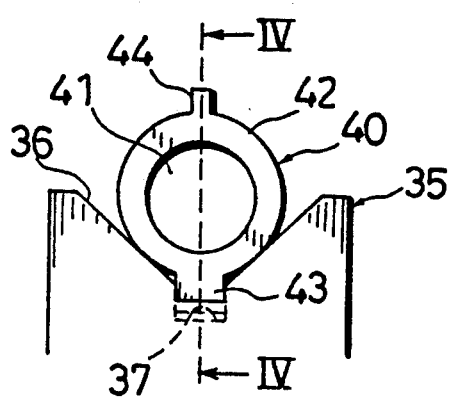
FIG. 3 is a front view of a principal portion of a first embodiment.
Figure 4:
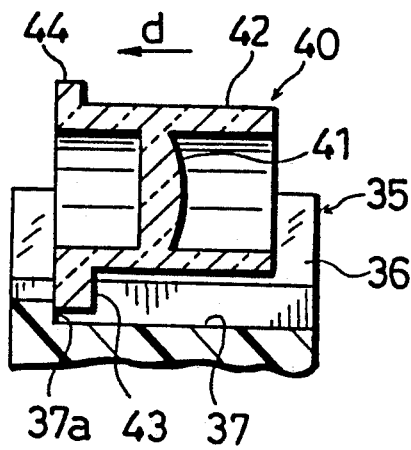
FIG. 4 is a section taken on line IV—IV of FIG. 3.

The first projection 43 of the cylindrical lens 40 has a width fitting tight in the groove 37, and a sufficient length for abutting on a step 37a of the groove 37. When, as shown in FIGS. 3 and 4, the cylindrical lens 40 is placed on the holder 36 with the first projection 43 engaging the groove 37, the engagement between the first projection 43 and groove 37 determines an inclination of the generating line of the effective lens portion 41, eliminating the necessity to adjust the inclination. By urging the cylindrical lens 40 in a direction of arrow d in FIG. 4 to press the first projection 43 on the step 37a, a focal point is set to reflecting surfaces of the polygon mirror 23, eliminating the necessity to adjust the focal point.

Figure 5:
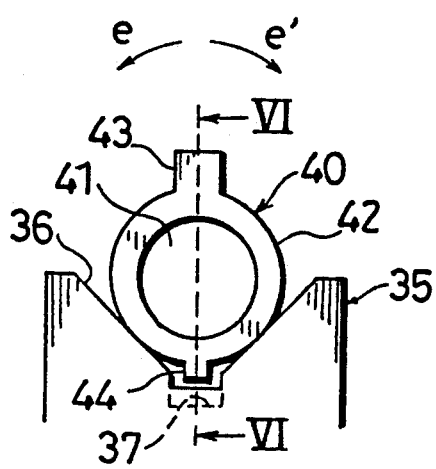
FIG. 5 is front view showing a different mounting mode.
Figure 6:
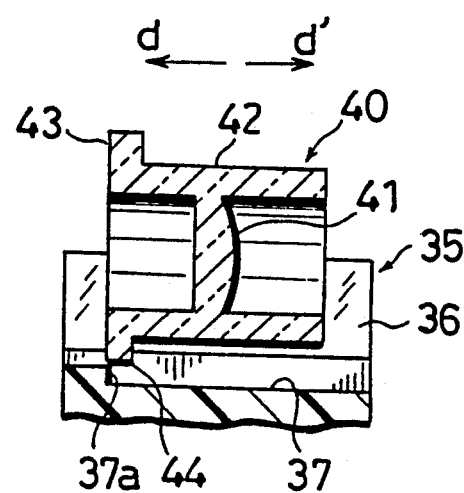
FIG. 6 is a section taken on line VI—VI of FIG. 5.

The second projection 44 has a smaller width than the groove 37, and a small length not reaching the step 37a (FIGS. 5 and 6). When the cylindrical lens 40 is placed on the holder 36 with the second projection 44 opposed to the groove 37, inclination of the generatrix of the effective lens portion 41 may be adjusted by turning the cylindrical lens 40 in a direction of arrow e or e' in FIG. 5. The focal point is adjustable by sliding the cylindrical lens 40 in a direction of arrow d or d' in FIG. 6.

The cylindrical lens 40 is pressed in position on the mount 35 by a presser 47 as shown in FIG. 2. The presser 47 is formed by press-working an elastic metal sheet, and includes a pair of right and left arms 48. The presser 47 is secured to the mount 35 by fitting positioning bores 49a formed therein around small projections 38a formed on upper surfaces of the mount 35, and inserting unillustrated screws through bores 49b of the presser 47 and turning the screws into threaded holes 38b in the mount 35. In this state, the arms 48 press the cylinder 42 from above, to fix the cylindrical lens 40 in position.

Figure 7:
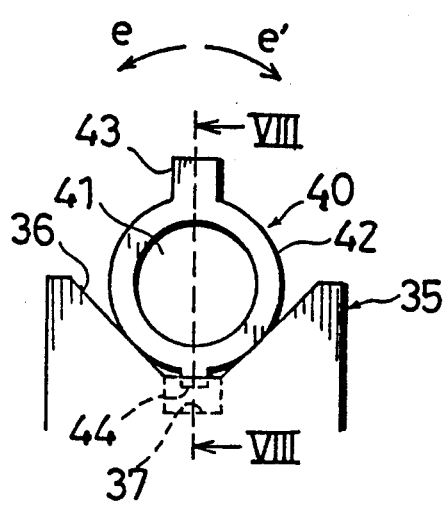
FIG. 7 is front view of a principal portion of a second embodiment.
Figure 8:
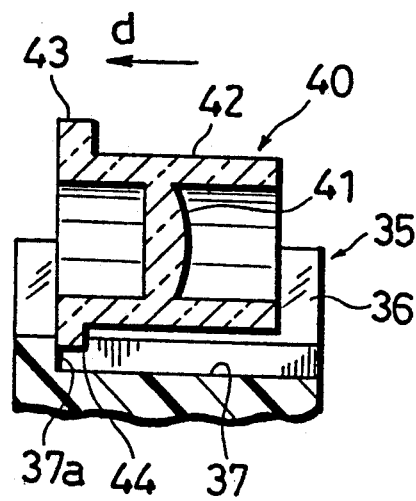
FIG. 8 is a section taken on line VIII—VIII of FIG. 7.

FIGS. 7 and 8 show a second embodiment.

In the second embodiment, the second projection 44 has a sufficient length to abut on the step 37a. The shape and function of the second projection 44 as well as other aspects are the same as in the first embodiment.

While, in this embodiment, the first projection 43 eliminates the necessities to adjust inclination of the generatrix and to adjust the focal point, use of the second projection 44 as abutment on the step 37a eliminates also the necessity to adjust the focal point. Thus, when the second projection 44 is used, only inclination of the generatrix may be adjusted by turning the cylindrical lens 40 in a direction of arrow e or e' in FIG. 7.

Figure 9:
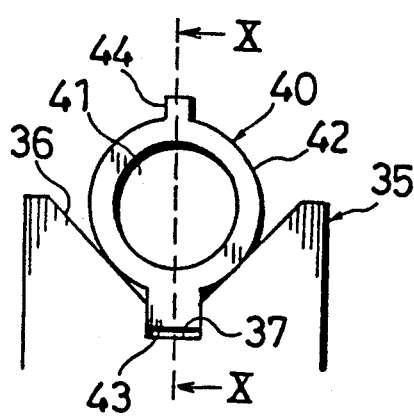
FIG. 9 is front view of a principal portion of a third embodiment.
Figure 10:
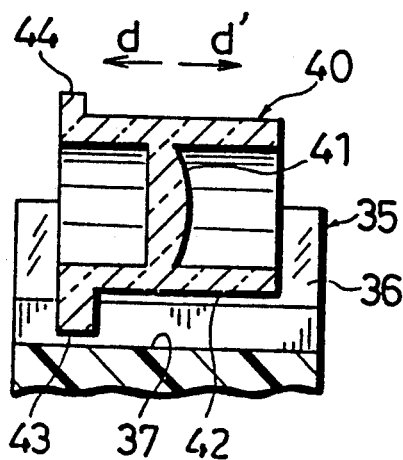
FIG. 10 is a section taken on line X—X of FIG. 9.

FIGS. 9 and 10 show a third embodiment.

In the third embodiment, the groove 37 is formed through an entire length of the lens holder 36, with the step 37a eliminated. Thus, when the first projection 43 is engaged with the groove 37, the generatrix requires no inclination adjustment, with the focal point adjustable by sliding the cylindrical lens 40 in a direction of arrow d or d' in FIG. 10. When the second projection 44 is opposed to the groove 37, both inclination of the generatrix and the focal point may be adjusted.

Figure 11:
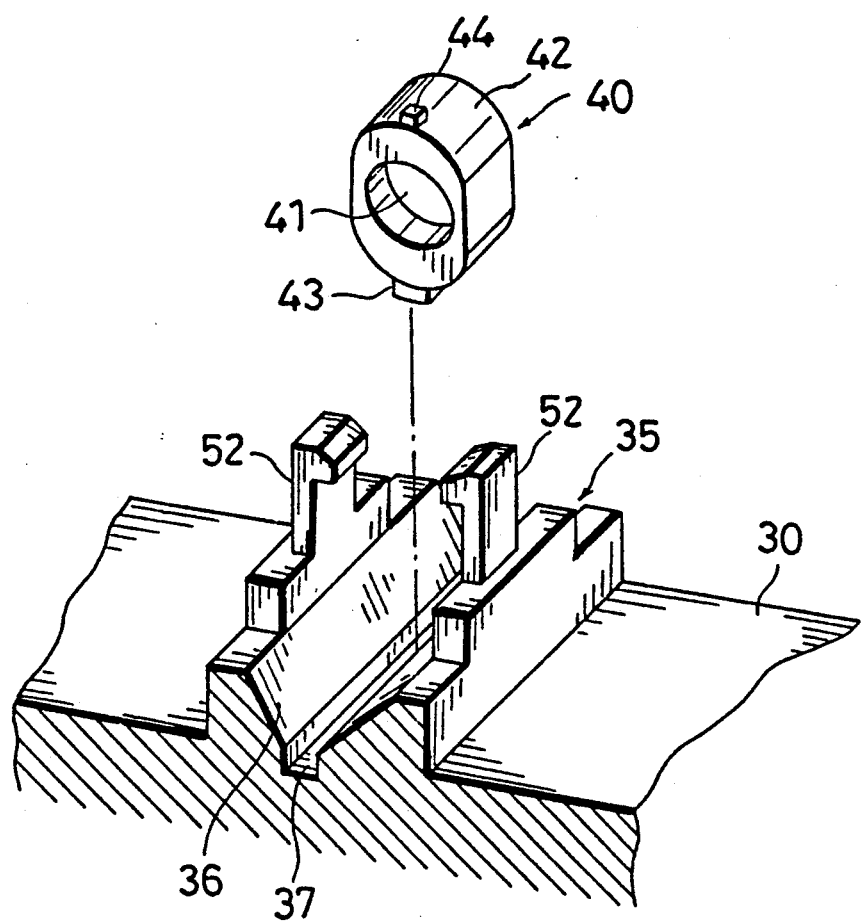
FIG. 11 is a perspective view of a principal portion of a fourth embodiment.
Figure 12:
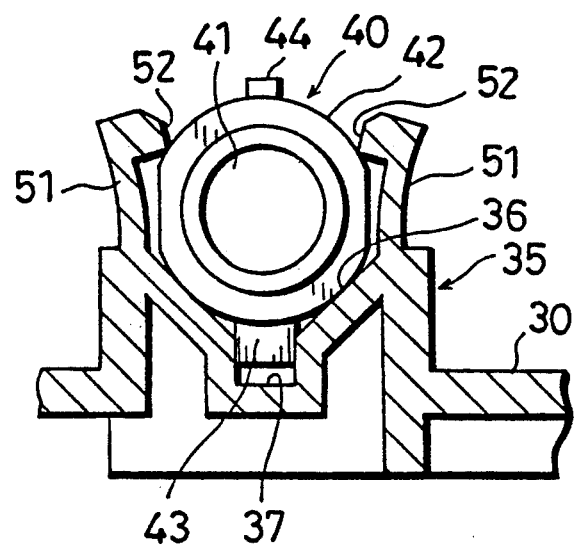
FIG. 12 is a view in vertical section of the fourth embodiment.

FIGS. 11 and 12 show a fourth embodiment which is similar to the third embodiment except in the manner of fixing the cylindrical lens 40. In this embodiment, a mount 50 includes, besides the V-shaped lens holder 36 and the groove 37 formed in the bottom of the holder 36, a pair of presser claws 51 projecting from opposite sides of the holder 36.

The cylindrical lens 40 may be set on the holder 36 with great facility by snap fitting the lens 40 between the presser claws 51 with the projection 43 or 44 opposed to the groove 37. When fitting the lens 40 in place, the presser claws 51 flex slightly outward and, as shown in FIG. 12, hooked ends 52 thereof resiliently contact and retain the cylinder 42. In this state, the axis of the cylindrical lens 40 concurs with the principal ray of the laser beam emitted from the light source assembly.

Subsequently, the focal point is adjusted when the projection 43 is fitted in the groove 37, or the focal point and inclination of the generatrix are adjusted when the projection 44 is fitted in the groove 37. Then the cylindrical lens 40 may be fixed to the mount 35 with an adhesive.

This mounting method may of course be applied to the first and second embodiments also.

In each of the described embodiments, the projections are formed peripherally of the cylinder of the cylindrical lens, and the groove is formed in the bottom of the holder of the mount. However, it is possible to reverse the positions of the projections and groove. That is, a projection may be formed in the bottom of the holder, with grooves formed in peripheral positions of the cylindrical lens. In this case, the grooves may have different widths and depths relative to the width and height of the projection, depending on the necessity of adjustment.

The laser beam scanning optical apparatus according to the present invention is not limited to the foregoing embodiments but is variable in many ways within the scope of the present invention.

For example, the second projection 44 in the first and third embodiments is not absolutely necessary but dispensable.

The location of the cylindrical lens is not limited to a position upstream of the polygon mirror to prevent the influence of a tilt thereof. For example, the cylindrical lens may be disposed immediately upstream of a light-receiving sensor (SOS sensor) for detecting an image recording start position in each scan.

The presser 47 may comprise a varied type. The cylindrical lens 40 may be fixed in place with an adhesive or the like instead of using the presser.

Further, although the effective lens portion 41 is shaped cylindrical in the foregoing embodiments, this shape is not limitative. A toric lens or various other anamorphic lenses may be used instead. That is, a similar effect is produced as long as the lens requires adjustment in the position of rotation and the position along the optical axis, such as a lens having a curved surface with asymmetry of rotation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical apparatus comprising:
   laser beam emitting means for outputting a laser beam modulated in accordance with image information;
   a lens unit including, all formed integral with one another, an effective lens portion, a cylindrical portion surrounding a side surface of said effective lens portion, and projecting means extending from peripheral positions of said cylindrical portion, said effective lens portion having a curved surface with asymmetry of rotation for refracting said laser beam with different powers in at least two directions; and
   supporting means including a holder for holding said cylindrical portion of said lens unit to be rotatable and axially slidable on an optical axis of said laser beam, and a groove parallel to the optical axis for receiving said projecting means.

2. An optical apparatus as defined in claim 1, wherein said curved surface of said effective lens portion is a cylindrical at least one of surface and toric surface.

3. An optical apparatus as defined in claim 2, wherein said projecting means is equal in width to said groove.

4. An optical apparatus as defined in claim 2, wherein said projecting means has a smaller width than said groove.

5. An optical apparatus as defined in claim 2, wherein said lens unit includes a first projection equal in width to said groove, and a second projection having a smaller width than said groove, said first projection and said second projection being formed in positions of rotation symmetry peripherally of said cylindrical portion.

6. An optical apparatus as defined in claim 2, wherein said groove includes a step for contacting said projecting means to limit movement of said lens unit along said optical axis.

7. An optical apparatus as defined in claim 6, wherein said lens unit includes a first projection having a height contactable with said step, and a second projection having a height clear of said step, said first projection and said second projection are formed in positions of rotation symmetry peripherally of said cylindrical portion.

8. An optical apparatus comprising:
   laser beam emitting means for outputting a laser beam modulated in accordance with image information;
   a lens unit including, all formed integral with one another, an effective lens portion, a cylindrical portion surrounding a side surface of said effective lens portion, and projecting means extending from peripheral positions of said cylindrical portion; and
   supporting means including a holder for molding said cylindrical portion of said lens unit to be rotatable and axially slidable on an optical axis of said laser beam, a groove parallel to the optical axis for receiving said projecting means, and presser means for pressing said lens unit to the holder.

9. An optical apparatus as defined in claim 8, wherein said presser means is formed of an elastic material.

10. An optical apparatus as defined in claim 9, wherein said holder and said presser means are formed integral with each other.

11. An optical apparatus as defined in claim 10, wherein said effective lens portion has a curved surface with asymmetry of rotation for refracting said laser beam with different powers in at least two directions.

12. An optical apparatus as defined in claim 11, wherein said projecting means is equal in width to said groove.

13. An optical apparatus as defined in claim 11, wherein said projecting means has a smaller width than said groove.

14. An optical apparatus as defined in claim 11, wherein said lens unit includes a first projection equal in width to said groove, and a second projection having a smaller width than said groove, said first projection and said second projection being formed in positions of rotation symmetry peripherally of said cylindrical portion.

15. An optical apparatus as defined in claim 11, wherein said groove includes a step for contacting said projecting means to limit movement of said lens unit along said optical axis.

16. An optical apparatus as defined in claim 15, wherein said lens unit includes a first projection having a height contactable with said step, and a second projection having a height clear of said step, said first projection and said second projection are formed in positions of rotation symmetry peripherally of said cylindrical portion.

17. An optical apparatus comprising:
- laser beam emitting means for outputting a laser beam modulated in accordance with image information;
- a lens unit including an effective lens portion, and a cylindrical portion formed integral with and surrounding a side surface of said effective lens portion, said cylindrical portion defining groove means in a peripheral surface thereof, said effective lens portion having a curved surface with asymmetry of rotation for refracting said laser beam with different powers in at least two directions; and
- supporting means including a holder for holding said cylindrical portion of said lens unit to be rotatable and axially slidable on an optical axis of said laser beam, and a projection for extending into said groove means.

18. An optical apparatus as defined in claim 17, wherein said lens unit includes a first groove equal in width to said projection, and a second groove having a larger width than said projection, said first groove and said second groove being formed in positions of rotation symmetry peripherally of said cylindrical portion.

19. An optical apparatus as defined in claim 17, wherein said groove means includes a step for contacting said projection to limit movement of said lens unit along said optical axis.

20. An optical system comprising:
- a lens unit including, all formed integral with one another, an effective lens portion, a cylindrical portion surrounding a side surface of said effective lens portion, and projecting means extending from peripheral positions of said cylindrical portion, said effective lens portion having a curved surface with asymmetry of rotation; and
- supporting means including a holder for holding said cylindrical portion of said lens unit to be rotatable and axially slidably on an optical axis of said effective lens portion, and a groove along the optical axis for receiving said projecting means.

21. A combination optical lens unit and support assembly comprising:
- a lens element;
- a mounting member surrounding the lens element and having a first projection and a second projection extending radially outward from the mounting member at positions approximately 180 degrees apart, the lens element, mounting member, and first and second projections being integrally molded as a lens mounting unit; and
- supporting means for operatively mounting the mounting member, including an elongated groove of a size to accommodate, respectively, the first and second projections, depending on the alignment of the lens mounting unit, the elongated grooves enabling a movement of the lens mounting unit along the elongated groove, and means for holding the lens mounting unit in the elongated groove.

* * * * *